US011014307B2

(12) United States Patent
Colvin et al.

(10) Patent No.: US 11,014,307 B2
(45) Date of Patent: May 25, 2021

(54) METHOD FOR GENERATING AND DEPICTING ADDITIVE MANUFACTURING BUILD SUPPORTS (71) Applicant: HONEYWELL INTERNATIONAL INC., Morris Plains, NJ (US)

(72) Inventors: Gregory Colvin, Phoenix, AZ (US); Michael Dillard, St. Louis Park, MN (US); Samir Nayak, Bangalore (IN); Robert De Mers, Elk River, MN (US); Melissa Bush, Tempe, AZ (US); Johnathon Wright, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/415,291

(22) Filed: May 17, 2019

(65) Prior Publication Data
US 2020/0361153 A1 Nov. 19, 2020

(51) Int. Cl.
B29C 64/393 (2017.01)
B33Y 50/02 (2015.01)
B29C 64/40 (2017.01)
G06F 30/20 (2020.01)
G05B 19/4099 (2006.01)
G06F 119/18 (2020.01)

(52) U.S. Cl.
CPC .......... B29C 64/393 (2017.08); B29C 64/40 (2017.08); B33Y 50/02 (2014.12); G05B 19/4099 (2013.01); G06F 30/20 (2020.01); G06F 2119/18 (2020.01)

(58) Field of Classification Search
CPC ....... B29C 64/393; B29C 64/40; G06F 30/20; G06F 2219/18; G05B 19/4099

USPC ......................................................... 700/118
See application file for complete search history.

(56) References Cited

U.S. PATENT DOCUMENTS

| 9,776,364 | B2 | 10/2017 | Wang | |
|---|---|---|---|---|
| 9,844,917 | B2 | 12/2017 | Burhop et al. | |
| 2014/0300017 | A1* | 10/2014 | Wighton | B29C 64/141 264/40.1 |
| 2015/0066178 | A1* | 3/2015 | Stava | B29C 64/40 700/98 |

(Continued)

OTHER PUBLICATIONS

Institute of Media Informatics Ulm University, Proceedings of the 5th Seminar on Research Trends in Media Informatics, Mar. 7, 2013.

(Continued)

Primary Examiner — Jigneshkumar C Patel
(74) Attorney, Agent, or Firm — Lorenz & Kopf, LLP (57) ABSTRACT A method for determining and optimizing manufacturing of an object by additive manufacturing. One or more computers access a three-dimensional digital model of the object and automatically generate a selected number of versions of supports for manufacture of the object. An image of the generated supports is displayed along with the object for visual perception by a user. The user visually observes the displayed versions of supports and object and uses the images to evaluate whether manufacturing the object by additive manufacturing is viable and whether the additive manufacturing supports are optimized. When viable, the object may be built by additive manufacturing using the optimized additive manufacturing supports to support the object.

19 Claims, 8 Drawing Sheets (56) References Cited

U.S. PATENT DOCUMENTS

| | | | | |
|---|---|---|---|---|
| 2015/0360421 | A1* | 12/2015 | Burhop | B29C 64/135 |
| | | | | 264/401 |
| 2016/0250810 | A1* | 9/2016 | Lynch August | G05B 19/4099 |
| | | | | 700/98 |
| 2017/0065176 | A1 | 3/2017 | Steinle et al. | |
| 2018/0065309 | A1* | 3/2018 | Tyler | B29C 64/118 |
| 2018/0079149 | A1* | 3/2018 | Suresh | B29C 64/386 |
| 2018/0215099 | A1* | 8/2018 | Sugano | G06F 30/00 |
| 2019/0018908 | A1* | 1/2019 | Yukumoto | B33Y 50/02 |

OTHER PUBLICATIONS

Eirlksson, E. R., Pedersen, D. B., Frisvad, J. R., Skovmand, L., Heun, V., Maes, P., & Aanæs, H. (2017). Augmented Reality Interfaces for Additive Manufacturing. In Scandinavian Conference on Image Analysis (pp. 515-525). Springer. Lecture Notes in Computer Science, vol. 10269, DOI: 10.1007/978-3-319-59126-1_43.

Cooper, Kenneth, et al., Contact-Free Support Structures for Part Overhangs in Powder-Bed Metal Additive Manufacturing, Inventions, Dec. 28, 2017.

Zeng, Kai, "Optimization of Support Structures for Selective Laser Melting," Aug. 2015, Electronic Theses and Dissertations. Paper 2221. Https://doi.org/10.18297/etd/2221.

Anonymous: "Materialise Magics 21—What's New," Mar. 29, 2018, XP055729491, Retrieved from the Internet: URL: https://web.archive.org/web/20180329064721if_/http://www.distrim.pt:80/wp-content/uploads/2017/07/Whats_new_Magics21_1_ENG.pdf [retrieved on Sep. 10, 2020].

* cited by examiner

METHOD FOR GENERATING AND DEPICTING ADDITIVE MANUFACTURING BUILD SUPPORTS

TECHNICAL FIELD

The present invention generally relates to additive manufacturing, and more particularly relates to methods for depicting and generating build supports for additive manufacturing of objects.

BACKGROUND

Various types of articles may be created using additive manufacturing processes. Additive manufacture includes processes such as those that create a component or item by the successive addition of particles, layers or other groupings of a material onto one another. The article is generally built using a computer controlled machine based on a digital representation, and includes processes approaches such as 3-D printing. A variety of different additive manufacturing processes are used such as processes that involve powder bed fusion, laser metal deposition, material jetting, or other methods.

Additive manufacturing of parts for example by using a laser powder bed for metals often requires supporting structures to help lock the part being built into a specific position and orientation during its laser fusion process. This is also because in typical metal three-dimensional additive manufacturing processes, the extent to which a section of the article being built can be disposed over a void is limited. For example, the size and angle of an unsupported overhang is limited. For many overhangs and voids, supports must be designed and printed. In many additive manufacturing builds, supports are fully fused structures that are physically removed in post processing operations. In these cases, the part and supports are designed and oriented so that supports can be accessed for successful removal. Accordingly, the design of additive manufacturing supports, including attachment location and density, impacts the results achieved during additive manufacturing part building and determines the extent of post-processing operations that may be required.

Therefore, it is desirable to provide methods for effective, efficient and economical creation of parts by additive manufacturing. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description section hereof. This summary is not intended to identify key or essential features of the claimed subject matter, nor is it intended to be used as an aid in determining the scope of the claimed subject matter.

A number of embodiments include a method for determining and optimizing manufacturing of an object by additive manufacturing. One or more computers access a three-dimensional digital model of the object and automatically generate a selected number of versions of supports for manufacture of the object. An image is generated of the supports and is displayed together with the object for visual perception by a user. The user visually observes the displayed versions of the supports and object and uses the images to evaluate whether manufacturing the object by additive manufacturing is viable and whether the additive manufacturing supports are optimized. When viable, the object may be built by additive manufacturing using the optimized additive manufacturing supports to support the object.

Other embodiments include a method of manufacturing an object that includes one or more computers that access a three-dimensional model of the object. The three-dimensional model is loaded into an application. The computer or computers running the application automatically generate at least one version of additive manufacturing supports for building the object using pre-determined design principles and object specific design principles. The computer or computers use augmented reality to visually display the additive manufacturing supports along with the object. While observing the visually displayed additive manufacturing supports, a user evaluates whether manufacturing the object by additive manufacturing is viable and whether the additive manufacturing supports are optimized. When viable, the object is built by additive manufacturing using the optimized additive manufacturing supports to support the object.

In additional embodiments, a method of manufacturing an object includes a computer that accesses a three-dimensional model of the object. A set of orientations of the object relative to a ground plane are selected. The three-dimensional model and the set of orientations are communicated via a data link connection to another computer which automatically generates a version of additive manufacturing supports for each orientation of the object in the set of orientations. The versions are generated using pre-determined design principles and object specific design principles and are communicated back to the first computer. The first computer uses augmented reality to visually display the additive manufacturing supports along with the object for each version. While observing the visually displayed additive manufacturing supports together with the object for each orientation, a user evaluates whether manufacturing the object by additive manufacturing is viable and if so, which of the orientations result in the additive manufacturing supports being optimized. The object is fabricated by additive manufacturing using the optimized version of the additive manufacturing supports to support the object. After being built, the additive manufacturing supports are removed from the fabricated object such as by machining.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In the following description, systems and methods are disclosed for forming components, parts, and other articles using additive manufacturing processes. Generally, supporting structures, which may sometimes be referred to below in a generic, non-limiting manner as supports, are formed in structures that are added during the additive manufacturing build process to hold areas of a part being built in place, including against the force of gravity. Generally, and not exclusively, supports are removed after the article, component or part is built. The removal operations are carried out after the additive manufacture steps. The systems and methods for depicting and generating additive manufacturing build supports disclosed herein provide effective, efficient and economical approaches for the creation of articles. In addition, development time is shortened by eliminating physical test-build iterations. As a result, the cost and lead time associated with manufacturing articles is minimized.

In a number of embodiments, additive manufacture generally includes processes such as those that create a physical object by the successive addition of particles, layers or other groupings of a material. The object is built using a computer controlled machine based on a digital representation, and includes processes that use supporting structures to help lock the part being built into a specific position and orientation such as during laser fusion build processes. A variety of additive manufacturing processes may be used such as processes that involve powder bed fusion, laser metal deposition, material jetting, or other methods. The following description may refer to manufacturing or additive manufacturing in general terms or may refer to specific additive manufacturing processes. However, the disclosure is not limited to any one specific manufacturing process but is generally applicable to building components that require supporting structures during the build process. The current disclosure advantageously enables the production of optimized designs that previously couldn't be efficiently created or were previously too expensive to make by additive manufacturing.

In an exemplary embodiment described in more detail below, systems and methods of manufacturing an object include creating a three-dimensional representation of the object by techniques such as by accessing computer aided design (CAD) data, by scanning a physical example of the object, by photographic imaging, or through other means of obtaining a digitization. The three-dimensional representation data is accessed by at least one computer and loaded into an application which generates a 3-D model. The application automatically generates at least one version of additive manufacturing supports for the object using the 3-D model and applying pre-determined design principles and object specific design principles. The computer employs augmented reality to visually display the additive manufacturing supports together with or superimposed onto the object physically or virtually. By observing the visually displayed additive manufacturing supports, determinations may be made as to whether manufacturing the object by additive manufacturing is viable and whether the build orientation and additive manufacturing supports are optimized. When, after any number of iterations, the determinations result in a preferred positive outcome, the object may be manufactured by additive manufacturing using the optimized additive manufacturing supports to support the object.

The current description relates to examples of systems and processes that employ steps and activities carried out by computers and others that employ discreet rules and judgements. These activities are integrated into practical applications including in the manufacture of physical articles meeting sophisticated criteria. The practical applications therefore, include elements that implement or use computer and/or mental activities in conjunction with particular and integral machines and manufactured articles. The specific machines employed, and the beneficial results achieved, are tangible and physical. The disclosed activities have practical utility and solve technological challenges. For example, in application the activities enable determining whether an article may be manufactured by additive manufacturing, how to best orient the article, how to minimize post processing requirements, and how to minimize support volume, along with providing other meaningful solutions. Certain limits exist on the activities in various embodiments where for example, the processes use additive manufacturing machinery, use physical supports, and result in the efficient creation of actual articles, parts or components.

A system supporting the forgoing activities may be embodied in a number of different versions including a client server version and a stand-alone version. For example, referring to FIG. 1, a system 100 includes a server, for example a computer 102, running an integrated software product 104 for engineering and production design that provides an environment for three-dimensional simulation, such as one that is based on an NX platform. The software product 104 may also be referred to as an application. The computer 102 is communicatively coupled with a portable client computer 106 carrying another software product as an application 108 adapted to interface with the software product 104. For example, the computer 106 may be a laptop, tablet, smartphone, or any computer that may be used in the field or at any other location, and that is capable of coupling with the computer 102 through a wired and/or wireless data link connection 110. It should be understood that the functions of the computers 102, 106 may be carried out in other embodiments by one stand-alone computer or by any number of computers. In the current embodiment, the computer 106 or its peripherals may have a scanning type capability for example, by including a photogrammetry app 112 that is configured to obtain data on a physical object 114 by analyzing the real-world physical object 114 to collect data on its shape. The collected data is then used to construct a digital 3-D model. For example, in some embodiments, sensors may be used to detect 116 light around the physical object 114 and the computer 106 actively interprets the collected information to convert that information into an image or other three-dimensional representation. In various embodiments, the detection 116 may be in the form of scanning, photography or other means of obtaining a digitized representation. The physical object 114 may be an article, part, component or any object that is desired to be manufactured, in particular by additive manufacturing. In some embodiments and when available, three-dimensional CAD data of the physical object 114 may be loaded onto the computer 106. In sum, the computer 106 stores or otherwise accesses the dimensions or likeness of the physical object 114 for creating a 3-D model in order to display, manipulate and evaluate the 3-D model and create an image thereof.

Figure 1:
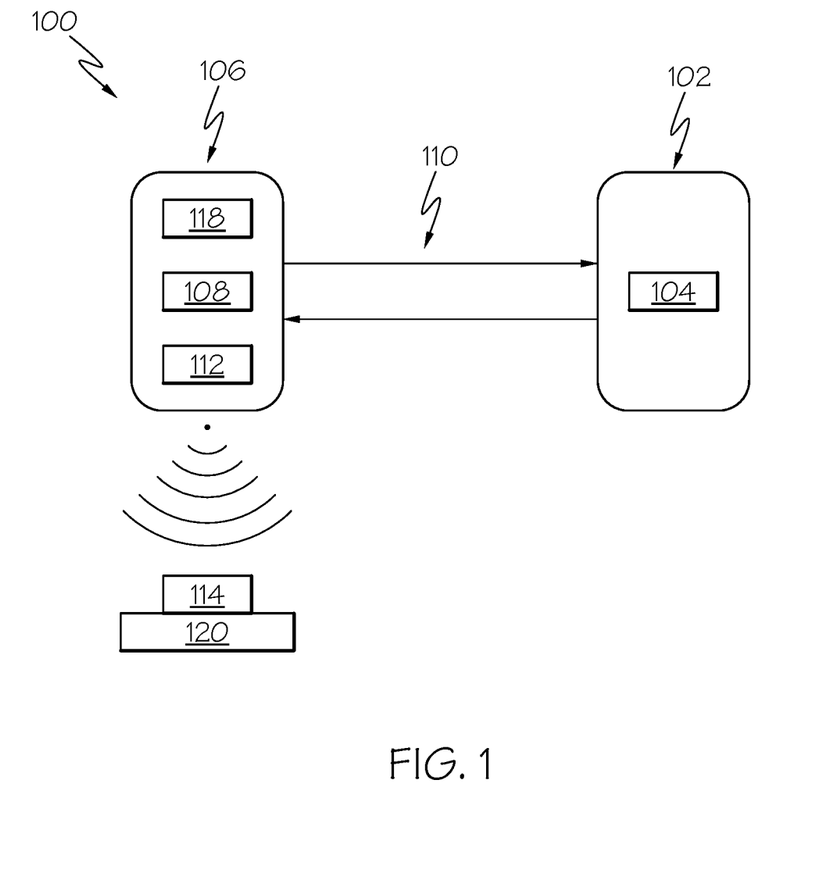
FIG. 1 is a schematic diagram of a system for generating, depicting and evaluating supports for additive manufacturing of objects, according to an exemplary embodiment.

Data on the physical object 114, such as CAD data or another basis for generating the 3-D model of the physical object 114 is uploaded from the computer 106 to the computer 102 through the connection 110. In addition, data on the orientation of the physical object 114 is included. For example, a number of orientations may be supplied. This may be accomplished by manipulating the 3-D model using the computer 106 or by placing the physical object 114 in various orientations and detecting 116 the orientations. In general, and as further detailed below, the computer 102 generates supports for the additive manufacture of the physical object 114 in the various orientations, which may be communicated back to the computer 106 through the connection 110.

Figure 2:
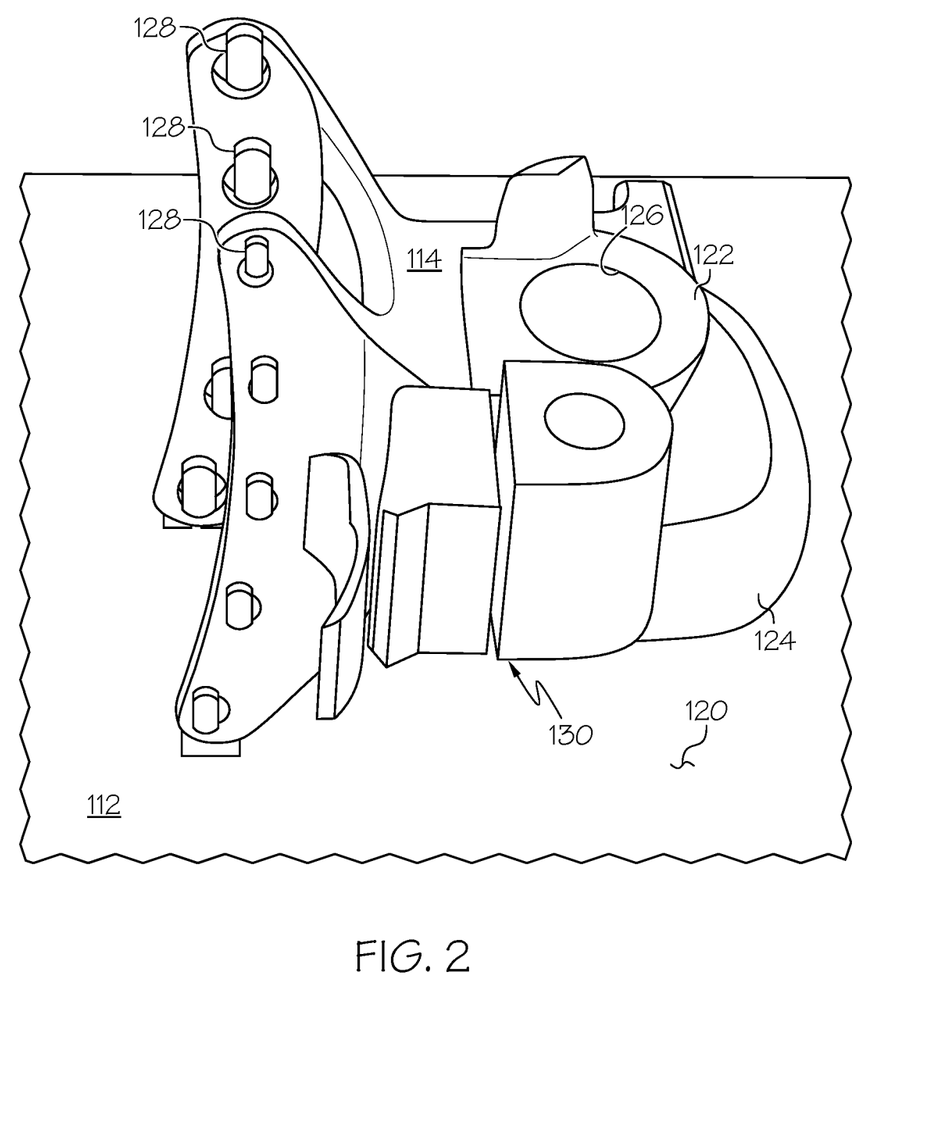
FIG. 2 is a perspective view of a displayed object with an overlay of generated additive manufacturing supports in three-dimensions, according to an exemplary embodiment.

In a number of embodiments, the supports 130 may be displayed on a screen 118 of the computer 106 along with the 3-D model of the physical object 114 and/or the supports may be superimposed on the physical object 114 such as illustrated in FIG. 2. The physical object 114 is oriented relative to a ground plane 120. As represented in this embodiment, the physical object 114 includes an overhang 122. Because the physical object 114 needs support to remain in the chosen orientation, a block 124 is positioned under the overhang 122. The physical object 114 includes a vertical opening 126, and a number of horizontal openings 128 in this orientation. The computer 102 processes the 3-D model of the physical object 114 in the selected orientation and generates a set of supports 130 for the additive manufacturing build of the physical object 114 as further described below. The set of supports are communicated to the computer 106 and superimposed on the physical object 114 and displayed on the screen 118.

Figure 3:
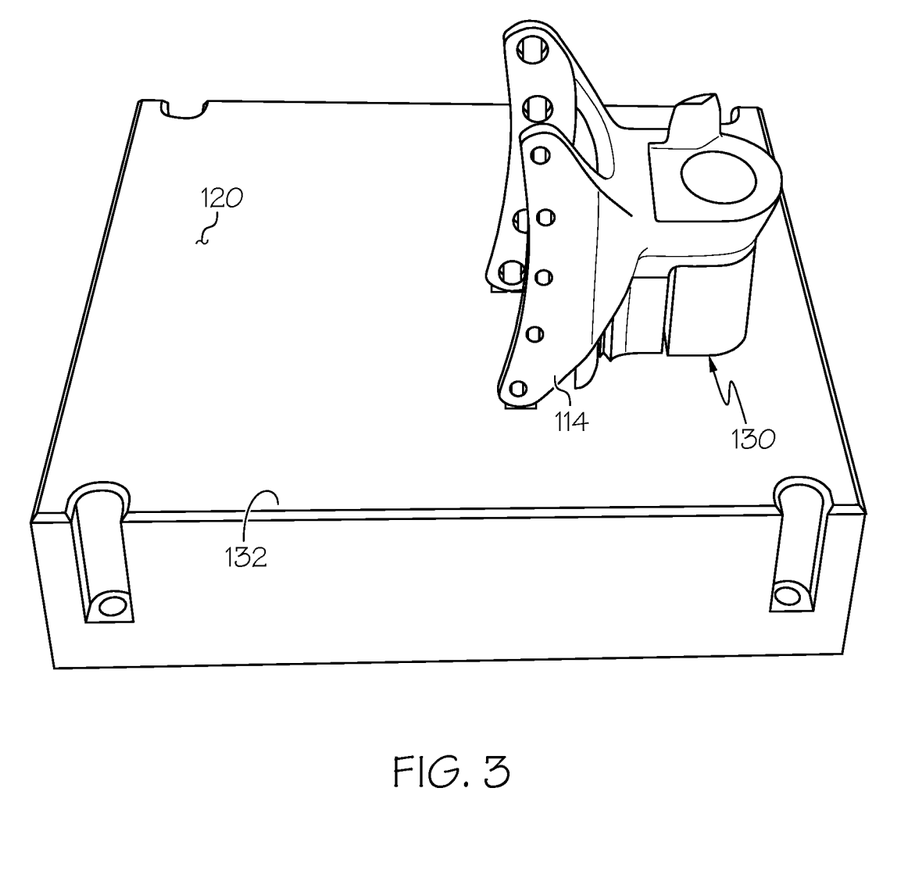
FIG. 3 is a perspective view of a displayed object with generated additive manufacturing supports for visualization in three-dimensions, according to an exemplary embodiment.

In a number of embodiments, images of the supports 130 may be displayed along with images of the physical object 114 as generated from the 3-D model on the screen 118 of the computer 106, such as illustrated in FIG. 3. The physical object 114 is oriented relative to a ground plane 120, which in this embodiment is displayed on a build platform 132. In a number of embodiments, the number of builds that will simultaneously fit on the build platform 132 are displayed together so that determinations may be made on the build efficiency. The computer 102 processes the three-dimensional representation data for the physical object 114 in the selected orientation and generates a set of supports 130 for the additive manufacturing build of the physical object 114 and fits them onto the build platform in the selected orientations. The set of supports are communicated to the computer 106 and displayed on the screen 118 along with the generated image of physical object 114. For this example of the orientation of the physical object 114, the opening 126 is oriented vertically so that it does not require internal support during the build process. The overhang 122 and the openings 128 being horizontal do require support during build, which is confirmed by the visualization. The support for the overhang 122 is divided into three parts with different heights. After building the physical object 114 the supports 130 may be removed, such as by machining.

In each of the foregoing embodiments, a user may visualize the generated supports 130 in a form of augmented reality where the physical object 114 has virtual supports displayed on the screen 118. In some embodiments, the supports 130 may be generated holographically and projected to create a form of mixed reality where the physical object 114 is shown with virtual supports 130. In any case, the user may observe the depicted additive manufacturing build supports 130 in three-dimensions to effectively grasp and evaluate the results. Any number of iterations may be generated to consider different orientations of the physical object 114 and the different supporting structures 130 that result. The user may visualize potential interferences, evaluate the minimization of support material use, and efficiently make other determinations that would be difficult without visualization. In addition, by referencing the visualization, potential additive manufacturing build options and additive manufacturing principles may be easily conveyed between a number of users.

As shown in FIG. 2, the supports 130 may be brought to the forefront so that they are visible through or over the physical object 114. As shown in FIG. 3, the supports 130 may be displayed in their as-built locations, and may be isolated for closer examination, similar to as shown in FIG. 2. Visualization enables optimally designing supports 130 in a process that would otherwise be difficult due to the often complex three-dimensional construction and the unique design characteristics of additive manufacturing build supports for complex articles. Different part geometries and orientations may be considered and through the visualization techniques disclosed herein, dramatic optimizations of the additive manufacturing supports may be made to build a part. For example, options may be considered to minimize the volume of support material, minimize the build time, simplify support removal after build and maximize the number of objects that may be simultaneously built on the same platform. All of these options are simplified through the visualization options provided herein. Additive manufacturing supports 130 may be generated for any physical part geometry and in any number of orientations to assess the support structure that most effectively and efficiently supports the physical object 114 during fabrication. The process uses augmented reality to help determine the viability of potential of building parts using additive manufacturing and to provide alternate support structures options to assist engineering in best setting up the part.

Figure 4:
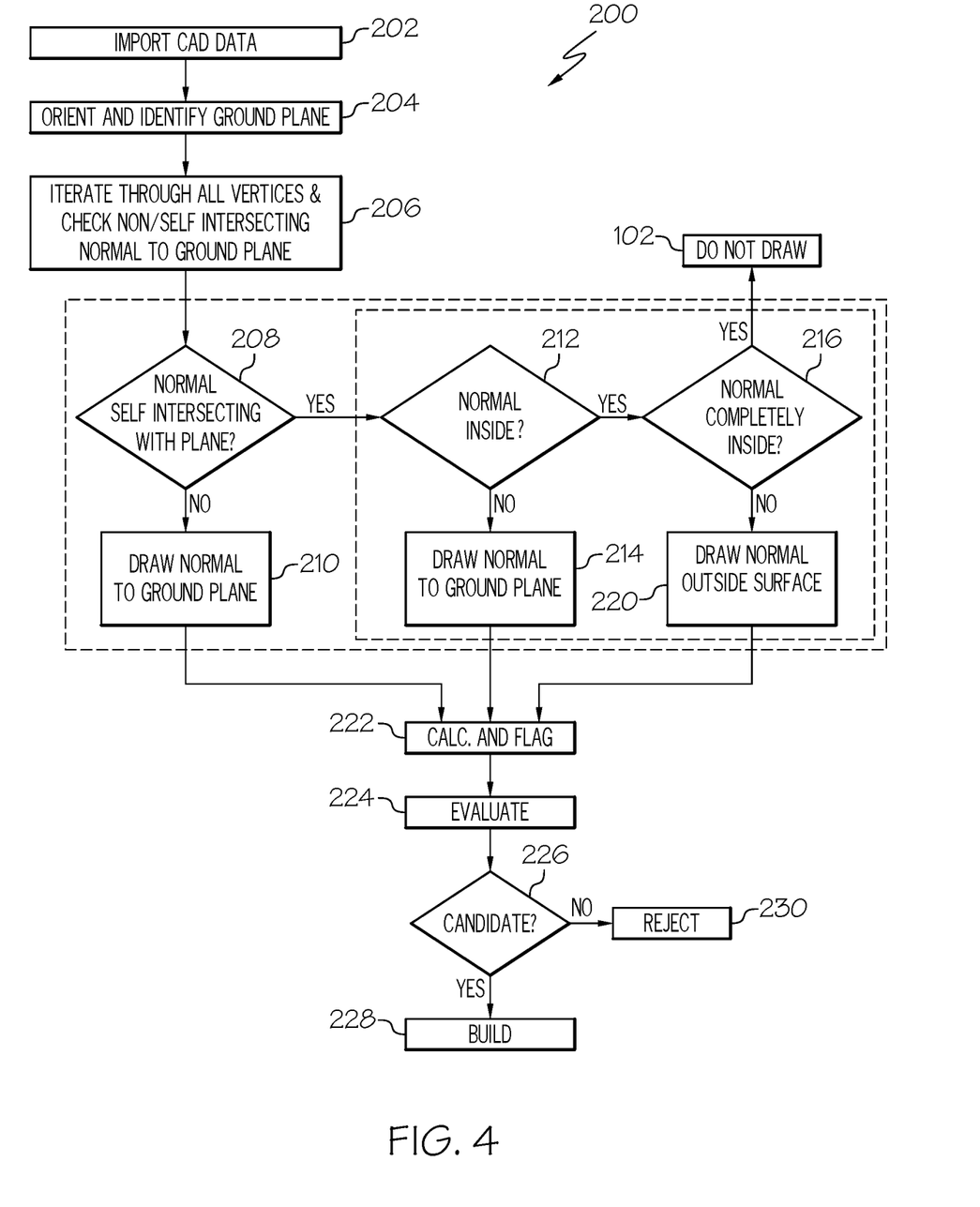
FIG. 4 illustrates a process for determining the viability of, and optimizing the supports for, additive manufacturing build of a visually displayed object, according to an exemplary embodiment.

Before creating a physical part by additive manufacturing, the build orientation must be defined. As described in the foregoing embodiments, selecting the build orientation is facilitated by creating visualizations of optional orientations and evaluating the results. Build orientation has an impact on several parameters including part accuracy, support volume, support complexity and surface finish. Support volume and complexity impact build time and build cost. As shown in FIG. 4, a process 200 includes ingesting/accessing 202 a representation of the physical object 114 from which a 3-D model may be generated. As noted above, this may take the form of CAD data, scanned-in data, imaging data or through other means that enable the processing and manipulating of the physical object 114 in 3-D form. An orientation of the physical object 114 is selected and the ground plane 120 location relative to the physical object 114 is defined 204. Given the geometry of the physical object 114 and its relation to the ground plane 120, the process 200 determines if and where supports 130 are needed and generates depictions.

Figure 5:
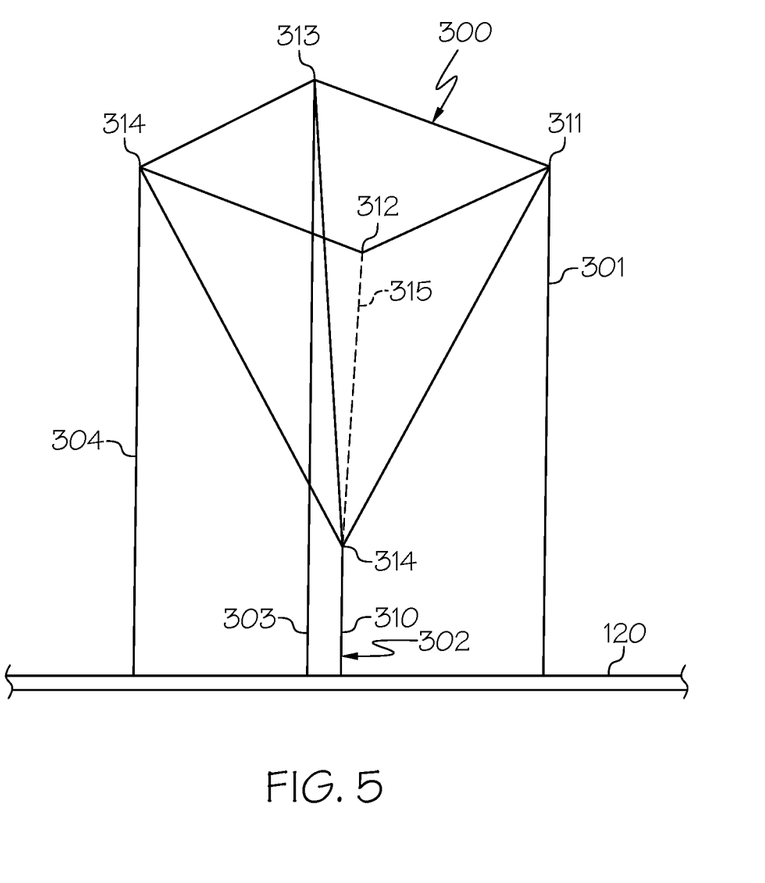
FIG. 5 is a schematic illustration of additive manufacturing support generation showing vertex-normal drawing steps to define supports, according to an exemplary embodiment.
Figure 7:
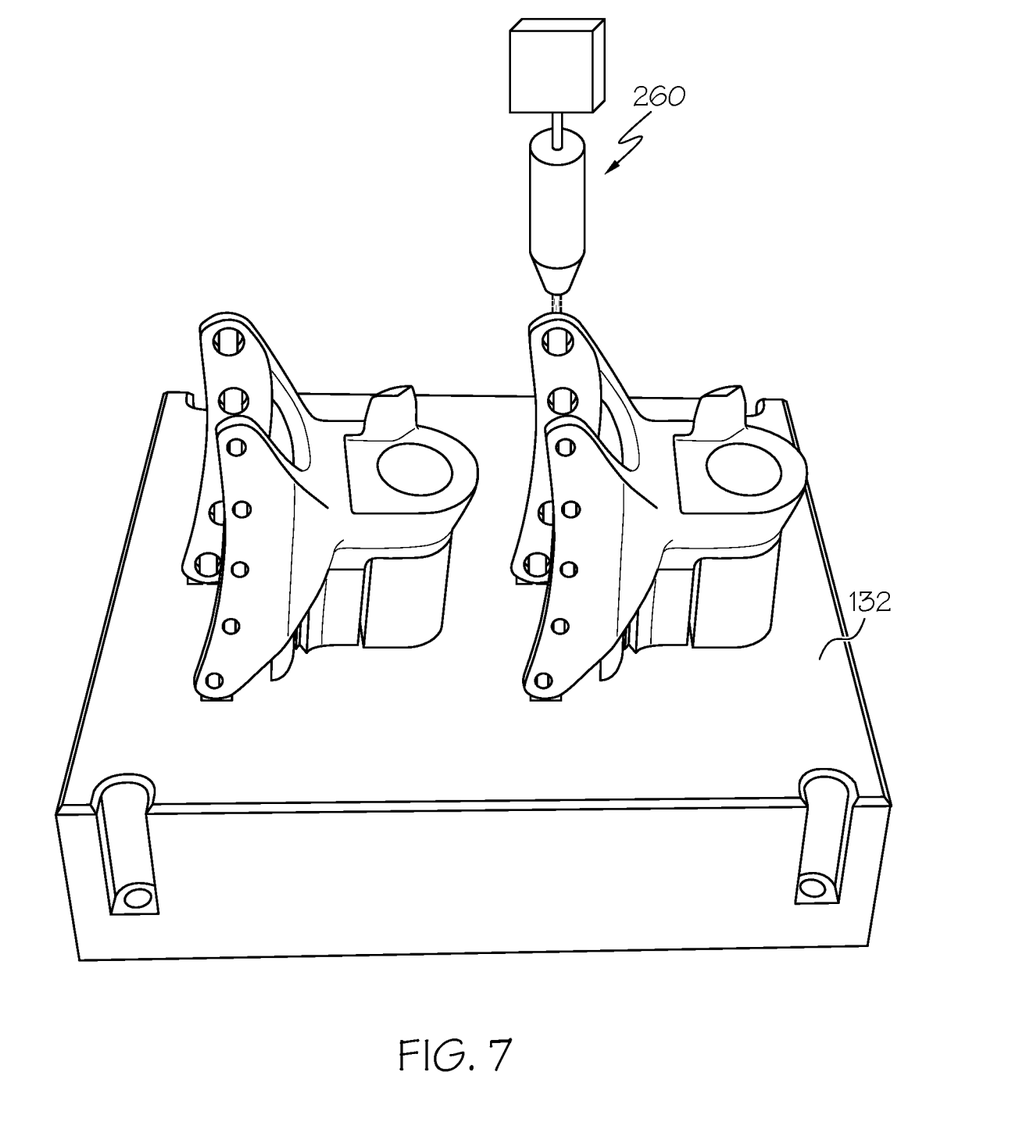
FIG. 7 is a schematic illustration of an additive manufacturing build, according to an exemplary embodiment.

With additional reference to FIG. 5, in the process 200 a representation of a physical object 300 under evaluation for additive manufacturing is oriented relative to the ground plane 120. It should be understood that the representation of a physical object 300 is oriented in this example for explanation purposes and has not necessarily been strategically selected for the best build orientation. The physical object 300 has been captured whether from CAD data, scanning or other digitization to support the generation of a 3-D model. Before transmitting the data to the server, the user may select desired build outcomes. For example, a user may select maximizing the yield per additive manufacture build. For example, how many builds will fit on the same build platform as shown in FIG. 7. In addition, the user may be concerned with robustness of the supports to maximize the chances of a successful build. The effect of these choices will be displayed to the user. The user may also re-orient the physical object 300 being imaged and will then be provided with a visualization of the support structure for any orientation, along with other build impacts such as the resulting surface area of support structure. Also, model layers may be enabled or disabled, and different perspectives considered for better visualization of the resulting support structures.

The process 200 proceeds to iterate through all vertices of the representation of the physical object 300 and verifies that the vertex-normals 301-304 are not self-intersecting. For example, for each vertex 311-314 of the representation of a physical object 300, a determination 208 is made as to whether the vertex-normals extending from each vertex to the ground plane 120 intersect any other part of the 3-D model of the physical object 300. Each vertex-normal 301-304 represents a definition line of the potential supports that will be generated for the iterated orientation. If a vertex-normal running to the ground plane 120 does not intersect with the geometry of the physical object 300 (other than at its respective vertex), then the vertex-normal is generated 210 and each of the other vertices are checked.

When the determination 208 results in a positive outcome, meaning that the vertex-normal does intersect with the part geometry of the 3-D model of the physical object 300, then additional determinations are made. First, the process 200 proceeds to determine 212 whether the vertex-normal is inside the 3-D model of the physical object 300. When the determination 212 is negative, meaning that the vertex-normal is not inside the representation of the physical object 300, the process 200 proceeds to generate 214 the vertex-normal to the ground plane 120 or to the first encountered surface. For example, as shown in FIG. 5, for the vertex-normal 302 from the vertex 312 to the ground plane 120, the vertex normal segment 310 is generated from where the vertex-normal 302 emerges at the point 314 from the 3-D model of a physical object 300 to the ground plane 120. The potential segment 315 within the 3-D model is not drawn and is not part of the support structure. In another example for the illustration of FIG. 2, a vertex-normal segment as a part of the support structure would be generated where the vertex-normal passes through the cylindrical openings 128.

Figure 6:
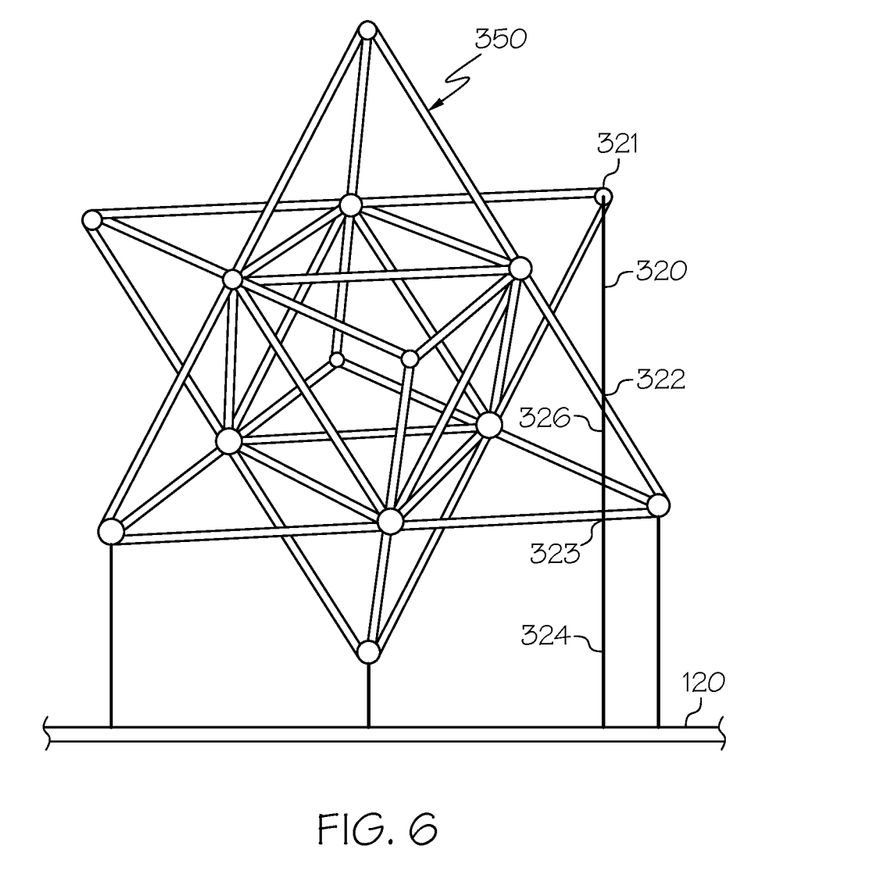
FIG. 6 is a schematic illustration of additive manufacturing support generation showing vertex-normal generation for an object with intersects, according to an exemplary embodiment.

When the determination 212 is positive, meaning that the vertex-normal is inside the representation of a physical object 300, the process 200 proceeds to determine 216 whether the vertex-normal is completely inside the representation of a physical object 300. If the determination is positive, then no vertex-normal is generated 218 and it is not depicted as a part of a support. If the determination is negative, then the segments of the vertex normal outside the representation of a physical object 300 are generated 220 as definitions of part of the supports. For example, as shown in FIG. 6, the vertex normal segment 320 is generated from the vertex 321 to the point 322 where the vertex-normal meets and enters the representation of a physical object 350. In addition, if the vertex-normal remerges from the representation of a physical object 350 it is generated to the ground plane 120. For example, the segment 324 from the point 323 to the ground plane 120 is generated. The segment 326 completely within representation of a physical object 350 is not generated and is not part of the support structure. When curved edges are defined by the representation of a physical object, points may be periodically generated along the curved edges for evaluating vertex-normals. The area bounded by the resulting vertex-normals and the 3-D model of the physical object define the volume where support structure is required.

Figure 8:
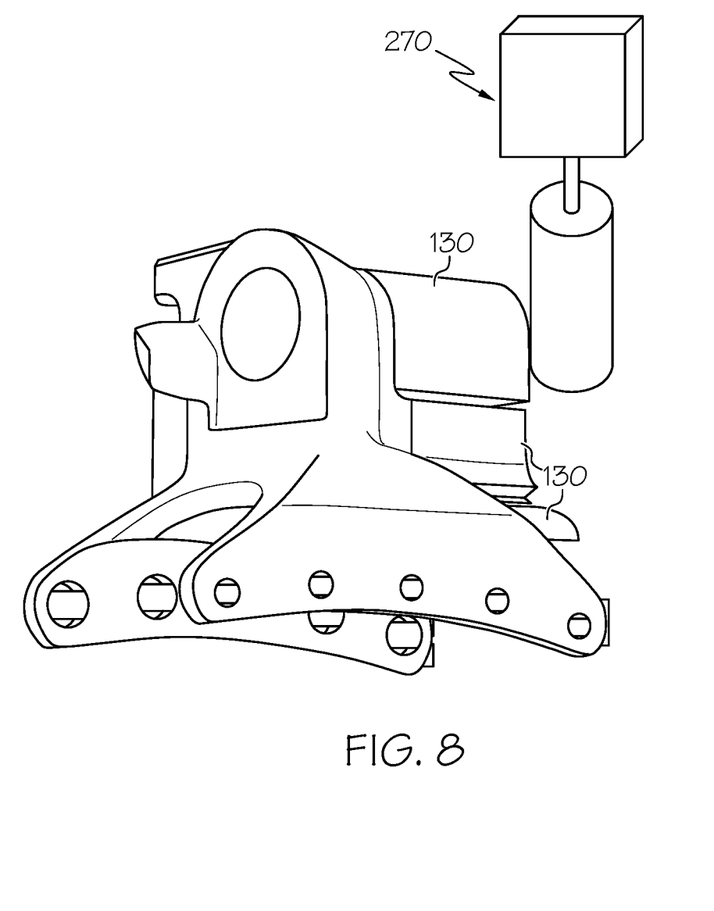
FIG. 8 is a schematic illustration of support removal processing, according to an exemplary embodiment.

For the given physical object geometry and orientation, the process 200 generates additive manufacturing supports for building the physical object. The generated supports are evaluated visually. In addition, the volume of the defined support structure is calculated 222. The time to deposit the volume is also calculated 222 based on the deposition rate of the additive manufacturing machine and the required volume. Thresholds for maximum desirable volume and time are determined for a given volume of the 3-D model of the physical object. When a threshold is surpassed, the process 200 flags 222 the issue for evaluation 224. In addition, the evaluation 224 may include determining whether post build support removal requirements are excessive. For example, if supports are generated extending through the opening 126 of FIG. 2 due to the selected orientation, then a determination may be made that boring the opening 126 after build is excessive. The process 200 is iterative to evaluate any number of selected orientations of the physical object 300 and a determination 226 is made as to whether the physical object is a valid candidate for additive manufacturing and which orientation is optimal. When the determination 226 is positive, the physical object 300 is manufactured 228 using an additive manufacturing machine 260 with the maximum number of items on the build platform 132 such as illustrated in FIG. 7. When the determination 226 is negative, other orientations may be evaluated through the process 200 or the part may be rejected 230 as a candidate for additive manufacturing. Following additive manufacturing build, the supports 130 are removed, such as through a milling machine 270 as depicted in FIG. 8.

Through the examples described herein, systems and methods determine and support optimization of supports for additive manufacturing design and build processes. The foregoing description outlines tools that supply visualizations of additive manufacturing supports to allow stakeholders to evaluate the ability to manufacture a physical part using additive manufacturing processes. During the development window, communication and knowledge transfer is improved by instructing engineers, designers, and supply chain participants in the optimal design of supports in complex three-dimensional constructions and in any unique design characteristics of build supports needed for the article. Augmented reality may be used to visually or graphically depict build supports to effectively convey the requirements for any potential article, component or part for which creation by additive manufacturing is desired. In addition, augmented reality enables determining the viability of potentially building parts using additive manufacturing and evaluating alternate options of support structures to speed development and assist in setting up the part for build.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of manufacturing an object comprising:
   obtaining, by at least one computer, a three-dimensional digital model of the object, wherein the three-dimensional digital model comprises a representation of the object that includes vertices;
   determining, by the at least one computer, a vertex-normal for each of the vertices, wherein each vertex-normal extends from a respective vertex of the three-dimensional digital model to a ground plane and is normal to the ground plane;
   determining, by iterating through all the vertices of the representation of the object, whether each determined vertex-normal is completely inside the representation of a physical object;
   automatically generating, by the at least one computer, at least one version of supports for manufacture of the object, including supports defined by the vertex-normals determined to be completely outside the representation;
   displaying, by the at least one computer, an image of the generated supports along with the object for visual perception by a user;
   evaluating, by observing the visually displayed supports and object, whether manufacturing the object by additive manufacturing is viable and whether the additive manufacturing supports are optimized; and
   fabricating the object by additive manufacturing using the additive manufacturing supports to support the object.

2. The method of claim 1, further comprising:
   selecting at least one object specific design principle for building the object; and
   generating, by the at least one computer, a flag indicating that the supports do not comply with the at least one object specific design principle.

3. The method of claim 2, wherein the at least one object specific design principle comprises minimum yield per build.

4. The method of claim 1, further comprising:
   selecting an orientation of the object relative to a ground plane;
   creating, by the at least one computer, visualizations of optional orientations of the object;
   evaluating the optional orientations for support complexity; and
   selecting, based on the support complexity, a build orientation from the optional orientations.

5. The method of claim 4, comprising evaluating the optional orientations for a surface finish parameter of the object; and selecting, based on the surface finish parameter, a build orientation from the optional orientations.

6. The method of claim 1, comprising:
   obtaining a physical example of the object;
   superimposing the generated supports onto the physical example of the object in an augmented reality; and
   determining, from the superimposed generated supports, whether manufacturing the object by additive manufacturing is viable, and whether a selected build orientation and the generated supports are optimized.

7. The method of claim 1, wherein displaying the image comprises displaying in virtual reality the supports superimposed onto the object so that the supports are fully visible.

8. The method of claim 1, comprising evaluating whether building the object using additive manufacturing is viable by evaluating, prior to building the object, removal requirements of the generated supports.

9. The method of claim 1, wherein displaying the image of the generated supports along with the object comprises displaying multiple images with the supports generated with the object in differing orientations.

10. A method of manufacturing an object comprising:
    obtaining a physical embodiment of the object;
    obtaining, by at least one computer, a three-dimensional model of the object;
    loading the three-dimensional model into an application;
    selecting an orientation of the object relative to a ground plane;
    determining, by the at least one computer, a vertex-normal for each vertex of the three-dimensional model of the object, wherein each vertex-normal extends from a respective vertex to the ground plane and is normal to the ground plane, wherein each vertex-normal represents a definition line of potential supports that will be generated for the at least one version of the additive manufactured supports;
    automatically generating, by the at least one computer running the application, at least one version of additive manufacturing supports for the object using pre-determined design principles and object specific design principles;
    using, by the at least one computer, augmented reality to visually display the additive manufacturing supports along with the physical embodiment of the object by superimposing the generated supports onto the physical embodiment of the object in the augmented reality;
    evaluating, while observing the visually displayed additive manufacturing supports, whether manufacturing the object by additive manufacturing is viable and whether the additive manufacturing supports are optimized; and
    fabricating the object by additive manufacturing using the additive manufacturing supports to support the object.

11. The method of claim 10, further comprising:
    selecting a set of object specific design principles for building the object;
    calculating, by the at least one computer, a volume of the generated additive manufacturing supports;
    calculating, by the at least one computer and based on the deposition rate, a time to deposit the volume;
    determining, by the at least one computer and based on the three-dimensional model of the object, a maximum volume threshold for the volume;

determining, by the at least one computer and based on three-dimensional model of the object, a maximum time to deposit threshold;

generating, by the at least one computer and when at least one of the maximum volume threshold and the maximum time threshold is surpassed, a flag indicating that the supports do not comply with the set of object specific design principles;

evaluating the generated additive manufacturing supports;

reorienting, when the flag is generated, the three-dimensional model of the object and generating revised additive manufacturing supports to reduce at least one of the volume and the time.

12. The method of claim 10, comprising determining, by the at least one computer iterating through all the vertices of the three dimensional model of the object, whether each vertex-normal intersects the object between the respective vertex and the ground plane.

13. The method of claim 12, comprising:
determining, by the at least one computer and when a vertex-normal is determined to intersect the object, whether the determined vertex-normal is completely within the object;
rejecting, by the at least one computer and when the vertex-normal is completely within the object, the vertex-normal as part of the supports; and
including, as part of the supports, vertex-normals determined to be outside the object.

14. The method of claim 10, wherein displaying the additive manufacturing supports comprises displaying in virtual reality the additive manufacturing supports superimposed onto the object so that the supports are fully visible.

15. The method of claim 10, comprising evaluating whether building the object using additive manufacturing is viable by evaluating, prior to building the object, removal requirements of the generated supports.

16. The method of claim 10, wherein displaying the image of the generated supports along with the object comprises displaying multiple images with the supports generated with the object in differing orientations.

17. The method of claim 10, comprising selecting, by the at least one computer creating visualizations of optional orientations of the three-dimensional model of the object, a build orientation; and evaluating whether the build orientation is viable.

18. The method of claim 10, wherein evaluating whether manufacturing the object by additive manufacturing is viable and whether the additive manufacturing supports are optimized comprises evaluating whether volume of the supports is minimized and evaluating removal of the supports after building the object.

19. A method of manufacturing an object comprising:
obtaining a physical embodiment of the object;
accessing, by a first computer, a three-dimensional model of the object comprising vertices and line segments connecting the vertices;
selecting a set of orientations of the object relative to a ground plane;
communicating, via a data link connection, the three-dimensional model and the set of orientations from the first computer to a second computer;
determining, by the second computer, a vertex-normal for each of the vertices, wherein each vertex-normal extends from a respective vertex of the three-dimensional digital model to a ground plane and is normal to the ground plane;
determining, by iterating through all the vertices of the representation of the object, whether each determined vertex-normal is completely inside the representation of a physical object;
automatically generating, by the second computer using pre-determined design principles and object specific design principles, a version of additive manufacturing supports for each orientation of the object in the set of orientations, including for each orientations, first supports defined by those vertex-normals determined to be completely outside the representation, and including second supports defined by segments of the vertex-normals determined to be outside the representation;
communicating via the data link connection, the generated versions of the additive manufacturing supports from the second computer to the first computer;
using, by the first computer and for each orientation, augmented reality to visually display the generated versions of the additive manufacturing supports along with the physical embodiment of the object;
evaluating, while observing the visually displayed additive manufacturing supports and object for each orientation, whether manufacturing the object by additive manufacturing is viable and if so, which of the orientations result in the additive manufacturing supports being optimized;
fabricating the object by additive manufacturing using the optimized version of the additive manufacturing supports to support the object; and
removing, by machining, the additive manufacturing supports from the fabricated object.

* * * * *